United States Patent [19]

Akiyoshi et al.

[11] Patent Number: 5,477,274
[45] Date of Patent: Dec. 19, 1995

[54] CLOSED CAPTION DECODER CAPABLE OF DISPLAYING CAPTION INFORMATION AT A DESIRED DISPLAY POSITION ON A SCREEN OF A TELEVISION RECEIVER

[75] Inventors: Koichiro Akiyoshi, Nara; Shuichi Kinoshita, Ikoma, both of Japan

[73] Assignee: Sanyo Electric, Ltd., Moriguchi, Japan

[21] Appl. No.: 198,034

[22] Filed: Feb. 17, 1994

[51] Int. Cl.[6] .................................................. H04N 7/087
[52] U.S. Cl. ............................................ 348/468; 348/564
[58] Field of Search ................................... 348/468, 461, 348/460, 564, 563; H04N 7/087

[56] References Cited

U.S. PATENT DOCUMENTS

| 3,897,792 | 6/1975 | Kimura | 348/468 X |
| 4,954,882 | 9/1990 | Kamemoto | 348/468 X |
| 4,965,670 | 10/1990 | Klinefelter | 348/565 |
| 5,045,941 | 9/1991 | Davies | 348/468 |
| 5,138,450 | 8/1992 | Fukuda et al. | 348/564 |
| 5,315,386 | 5/1994 | Muramoto | 348/461 |
| 5,327,174 | 7/1994 | Kim | 348/468 |

FOREIGN PATENT DOCUMENTS

| 0084185 | 4/1986 | Japan | H04N 7/087 |
| 4-159878 | 6/1992 | Japan . | |

Primary Examiner—Victor R. Kostak
Attorney, Agent, or Firm—Armstrong, Westerman, Hattori, McLeland & Naughton

[57] ABSTRACT

The display address contained in the caption signal sent from the sending side is converted into a desired display address by a closed caption decoder at the receiving side. The display position of the caption information is moved at the receiving side in order to prevent the superimposed information incorporated in the video signal from being overlapped with the caption information.

6 Claims, 10 Drawing Sheets

CLOSED CAPTION DECODER CAPABLE OF DISPLAYING CAPTION INFORMATION AT A DESIRED DISPLAY POSITION ON A SCREEN OF A TELEVISION RECEIVER

BACKGROUND OF THE INVENTION

1. Field of the Invention

The present invention relates to a closed caption decoder for extracting and decoding a transmitted caption signal multiplexed on a video signal thereby to produce caption information, and a television receiver having the closed caption decoder for displaying the caption information together with an image on the screen.

2. Description of Related Art

A closed caption system fox transmitting the same information as a voice in the form of caption signal multiplexed on the scanning signal during the vertical retrace period of the video signal has been employed for many television programs, video software, etc., in order to enable deaf-and-dumb persons and persons having a difficulty in hearing to enjoy the television broadcasting to the same degree as persons having no difficulty in hearing do. The encoding and transmission of the caption information are specified in detail by FCC (Federal Communication Commission) standards. Also, the closed caption system is used as a means for aiding in the understanding English by persons whose vernacular language is not English.

Figure 1:
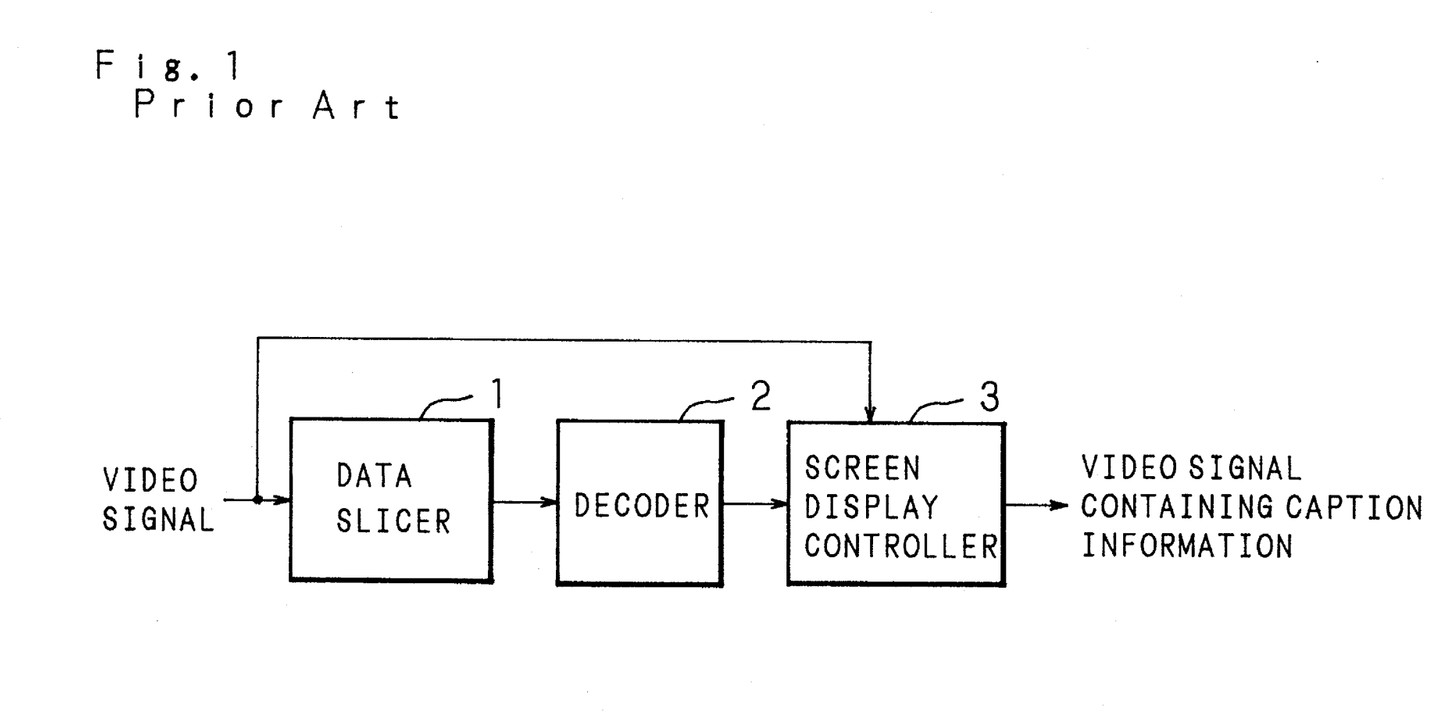
FIG. 1 is a block diagram showing the configuration of a conventional closed caption decoder.
Figure 2A:
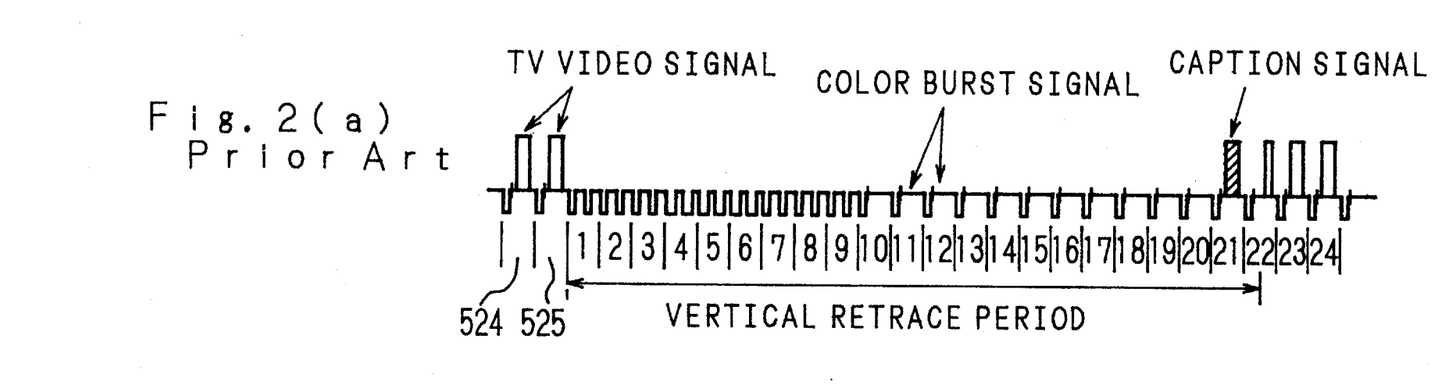
FIG. 2(a) is a diagram showing a waveform of the video signal multiplexed with the caption signal.
Figure 2B:
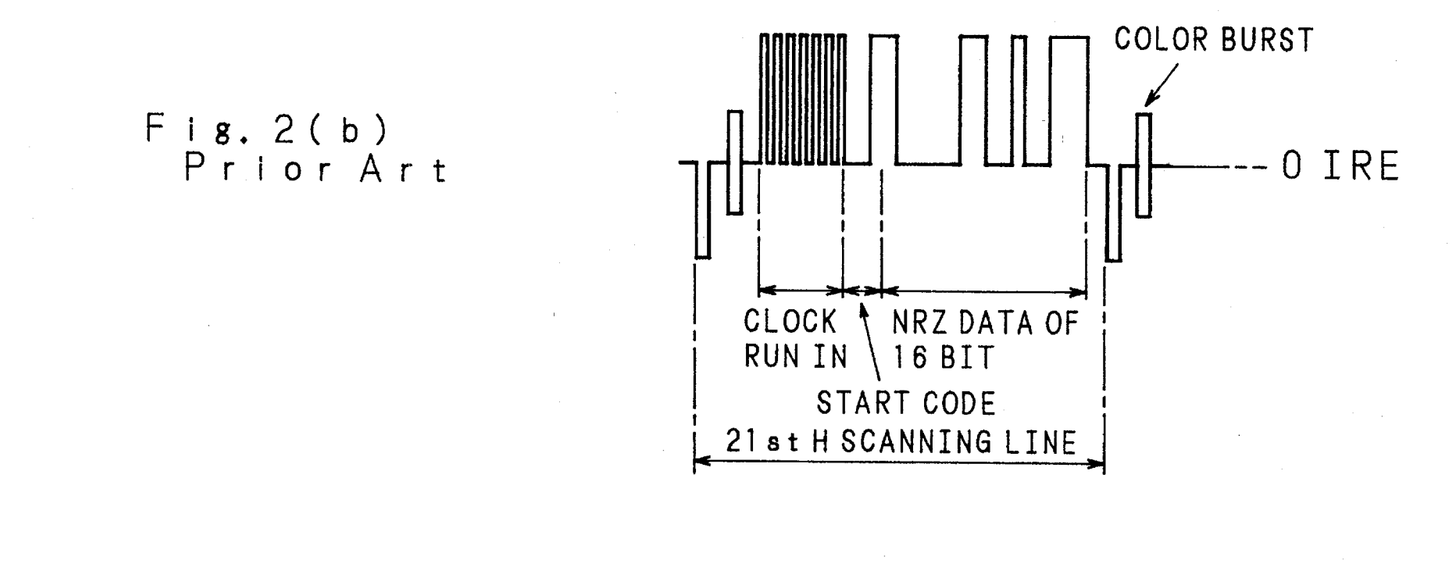
FIG. 2(b) is a diagram showing a waveform of the caption signal.

FIG. 1 is a block diagram showing a conventional closed caption decoder for extracting and decoding a caption signal from a video signal to produce caption information. FIG. 2(a) is a diagram showing a waveform of a video signal multiplexed with a caption signal, and FIG. 2(b) a waveform of a caption signal. The caption signal as caption information is multiplexed on the 21st H scanning signal, for example during the vertical retrace period.

Figure 3:
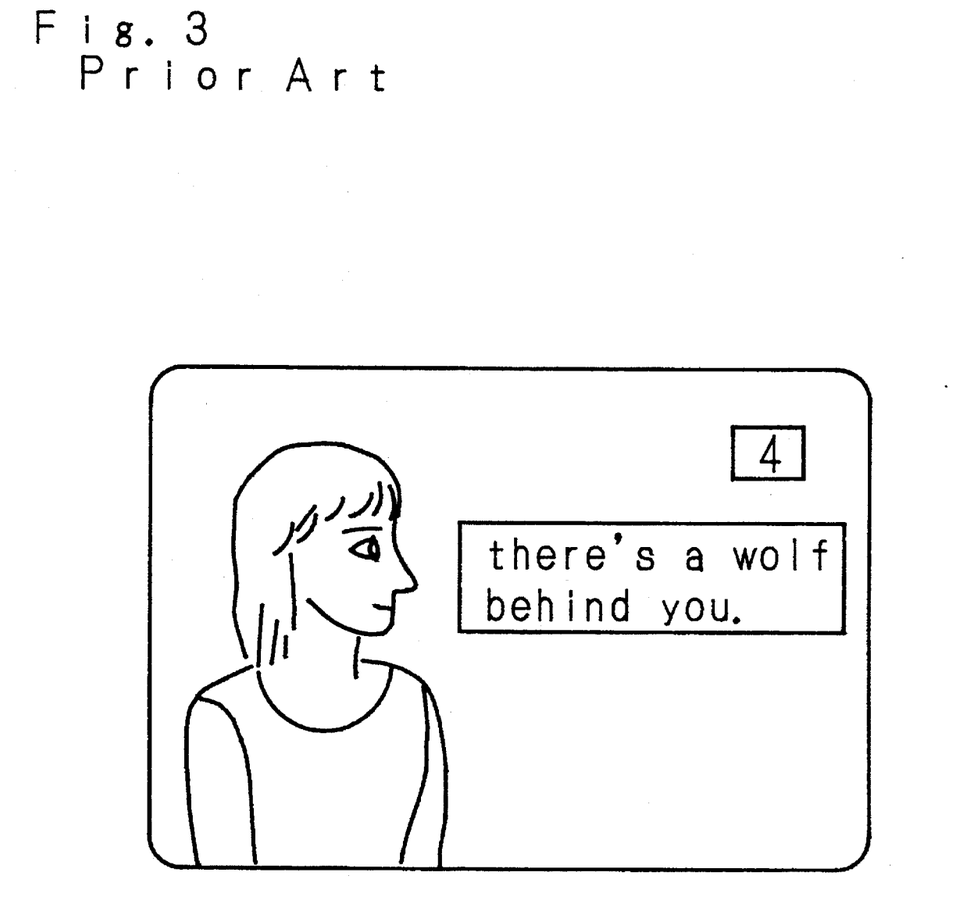
FIG. 3 is a diagram showing an example of caption information display by a conventional closed caption decoder.

A data slicer 1 extracts the multiplexed caption signal from the video signal and applies it to a decoder 2. The decoder 2 analyzes the display mode (caption, text), display style (paint-on, pop-on, roll-up), contents of characters, types of characters (display color, italic), display position, etc. of the extracted caption signal (caption information), according to the standards, and applies the result of analysis to a screen display controller 3. The screen display controller 3 supplied with the video signal, in accordance with the analysis result of the decoder 2, controls the character type and display position and produces a video signal containing the caption information, so that the title (caption information) as shown in FIG. 3 is displayed on the screen of television receiver together with the image.

Figure 4A:
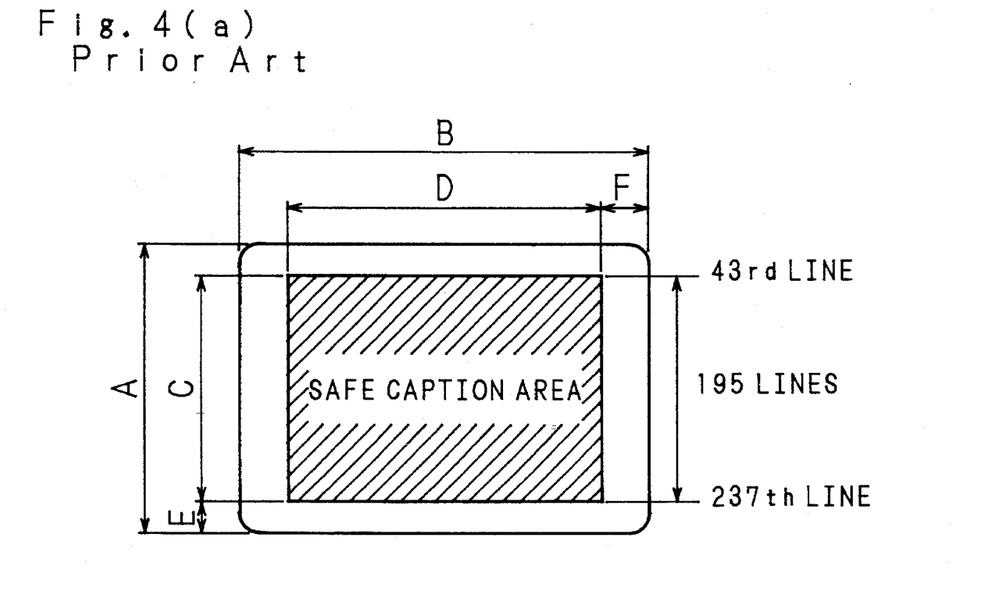
FIGS. 4(a), 4(b) are diagrams for explaining the display address of the caption information.
Figure 4B:
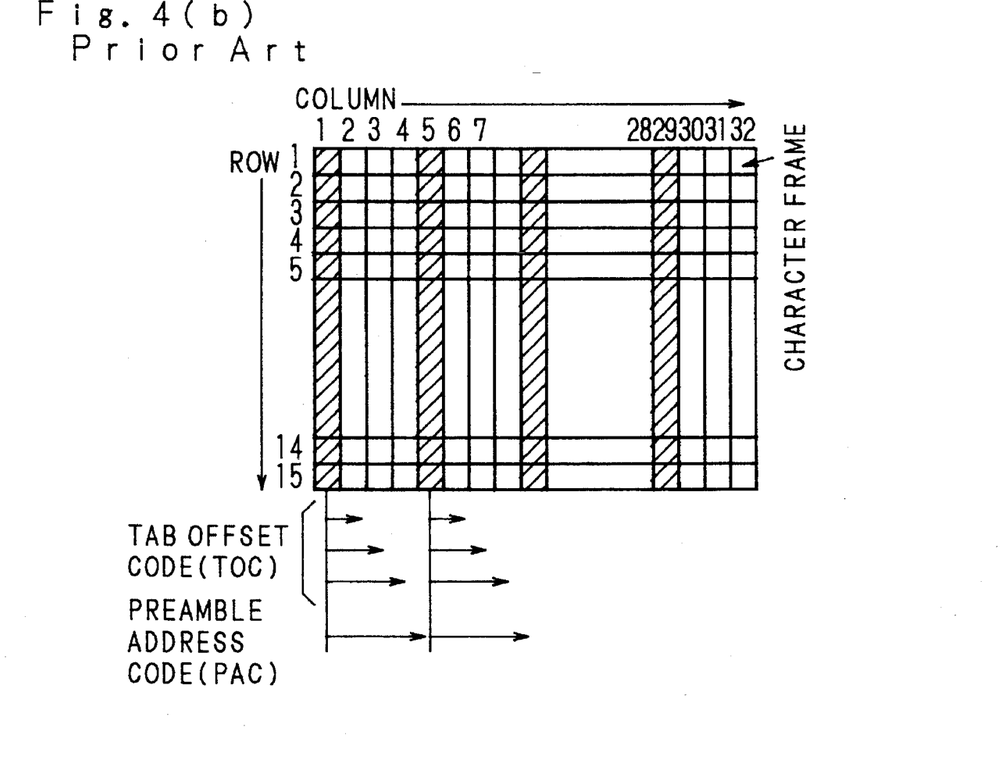

FIGS. 4(a) and 4(b) are diagrams for explaining the display address of the caption information on the screen. The display of the caption information is required for securing a view without any information drop-out on all the household television receivers. This region called a safe caption area is designated as shown in FIG. 4(a). In FIG. 4(a), characters A and B designate the height and width respectively of the television image. In FIG. 4(a), characters C, D, E and F designate the height, width, vertical position and horizontal position respectively of the safe caption area.

The safe caption area covers equally 15 rows and 32 columns for a total of 480 character frames as shown in FIG. 4(b) in order to permit character display at accurate positions. The display addresses are allotted to each of the 480 character frames, and are designated by the movement of the cursor (hypothetical mark invisible on the screen) based on the combination of a preamble address code (PAC) and a tab offset code (TOC) which are determined at the sending side of the video signal. PAC is a code composed of the row number and one of eight "numerals for identifying the character frame (indent)". Each indent is designated by moving the cursor from the left end rightward by four columns. For example, indent 0 designates column 1, and indent 1 column 5. TOC has three control codes (TOC1, TOC2 and TOC3) including rightward cursor movement by one column, two columns and three columns, respectively. As a result, a row is designated by PAC and a column also by PAC in a unit of four columns, followed by movement of the cursor by 1, 2 or 3 columns by TOC, thereby making it possible to designate the address of all the character frames.

The caption information is displayed by this address designation in the character frame at an arbitrary position in the safe caption area as intended at the sending side.

In the conventional closed caption decoder configured as described above, the display position of the caption information is uniquely determined by address designation at the sending side. In the case where the display position of the character according to closed caption is designated at the lower area of the screen, it may be overlapped on the superimposed information (subtitle, etc.) in the picture. If the character according to closed caption is displayed on the credit line of the particular broadcast station, the names of the casters or performers, the news title or the like on display during a news or show program, for example, these superimposed information are hidden undesirably. For this reason, in the case where the caption decoding functions, although the voice information can be understood by the character display according to closed caption, the superimposed information inherently incorporated in the video information is hidden, thereby leading to the problem of a lower degree of understanding.

SUMMARY OF THE INVENTION

An object of the invention is to provide a closed caption decoder capable of changing the display position of the caption information at the receiving side and a television receiver having such a closed caption decoder.

Another object of the invention is to provide a closed caption decoder capable of preventing the caption information and the superimposed information contained in the video signal from being overlapped on the screen and a television receiver having such a closed caption decoder.

According to one aspect of the invention, there is provided a closed caption decoder, in which an encoded caption signal multiplexed in the vertical retrace period of a video signal is extracted and decoded, and the display address of the caption information contained in the caption signal is converted into another display address designated arbitrarily at the receiving side. The caption information is displayed at the display position on the screen of a television receiver corresponding to the designated display address.

According to another aspect of the invention, there is provided a closed caption decoder, in which an encoded caption signal multiplexed in the vertical retrace period of a video signal is extracted and decoded, the display period of the caption information is detected, decision is made as to whether character information (including superimposed information) is contained in the video signal during the caption information display period, and if it is so contained, the display address of the caption information is converted into an address different from the display address of the character information. For this reason, the caption information according to closed caption and the character information incorporated in the video signal are prevented from being overlapped on each other on the screen of the television receiver.

The above and further objects and features of the invention will more fully be apparent from the following detailed description with accompanying drawings.

DESCRIPTION OF THE PREFERRED EMBODIMENTS

Figure 5:
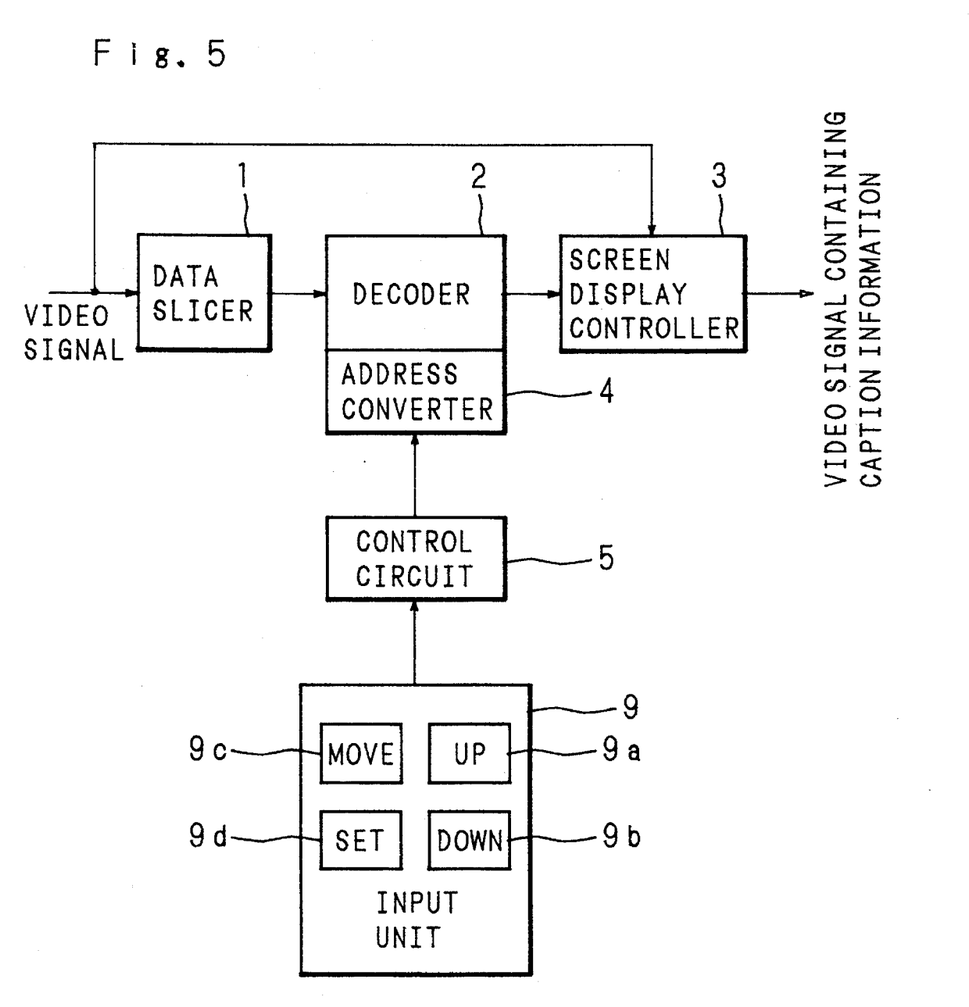
FIG. 5 is a block diagram showing the configuration of a closed caption decoder according to a first embodiment of the invention.

The invention will be described in detail below with reference to the drawings showing embodiments.
(First embodiment)
A block diagram of a closed caption decoder according to the first embodiment of the invention is shown in FIG. 5. The configuration shown in FIG. 5 includes an address converter 4, a control circuit 5 and an input unit 9 added to a conventional example. In FIG. 5, the video signal is applied to a data slicer 1 and a screen display controller 3. The data slicer 1 extracts the caption signal from the video signal on which it is multiplexed, and applies it to a decoder 2. The decoder 2, like the conventional example (FIG. 1), analyzes the display mode, the display style, the character contents, the character type, the display position, etc. of the extracted caption signal (caption information), and applies the analysis result other than the address data representing the display position to the screen display controller 3.

The address converter 4, under the control of the control circuit 5, converts the address data representing the display position analyzed by the decoder 2 into another address data applied from the input unit 9, and applies the address data thus converted to the screen display controller 3 through the decoder 2. The screen display controller 3 controls the character type, the display position, etc. in accordance with the output of the decoder 2 and produces a video signal containing the caption information.

The input unit 9 includes four types of keys, an up key 9a, a down key 9b, a move key 9c and a set key 9d. The desired address data is designated by the key entry operation of these keys. The control circuit 5 controls the address converter 4 in such a manner as to convert to the designated address data. Each time the up key 9a is depressed, the caption character is moved upward by one line for display. Conversely, each depression of the down key 9b moves the caption character downward by one line for display. Also, the move key 9c is depressed for moving the caption character to an arbitrary position desired by the operator. The set key 9d, on the other hand, is one for setting a predetermined position to which caption character, if any, is always moved. Once the set key 9d is depressed, the caption character is moved to and displayed at the predetermined position, in which case the move key 9c is not required to be depressed.

Now, the operation of the invention will be explained centered on the address data conversion making up the feature of the invention.

The data analyzed by the decoder 2 is decided on as to whether an address code is involved or not. In the case where the data is not an address code, the data is passed as it is, while in the case of an address code, it is replaced by an address inputted and designated by the input unit 9 to provide the desired display position. This algorithm executed at the address converter 4 is that of a type of filtering process which can be realized by a simple condition decision and an operation program. In the case where this algorithm is selected, the address designation determined by PAC and TOC mentioned above is converted to another address designation by arithmetic operation.

Three specific examples of address code conversion are explained below.

Figure 6:
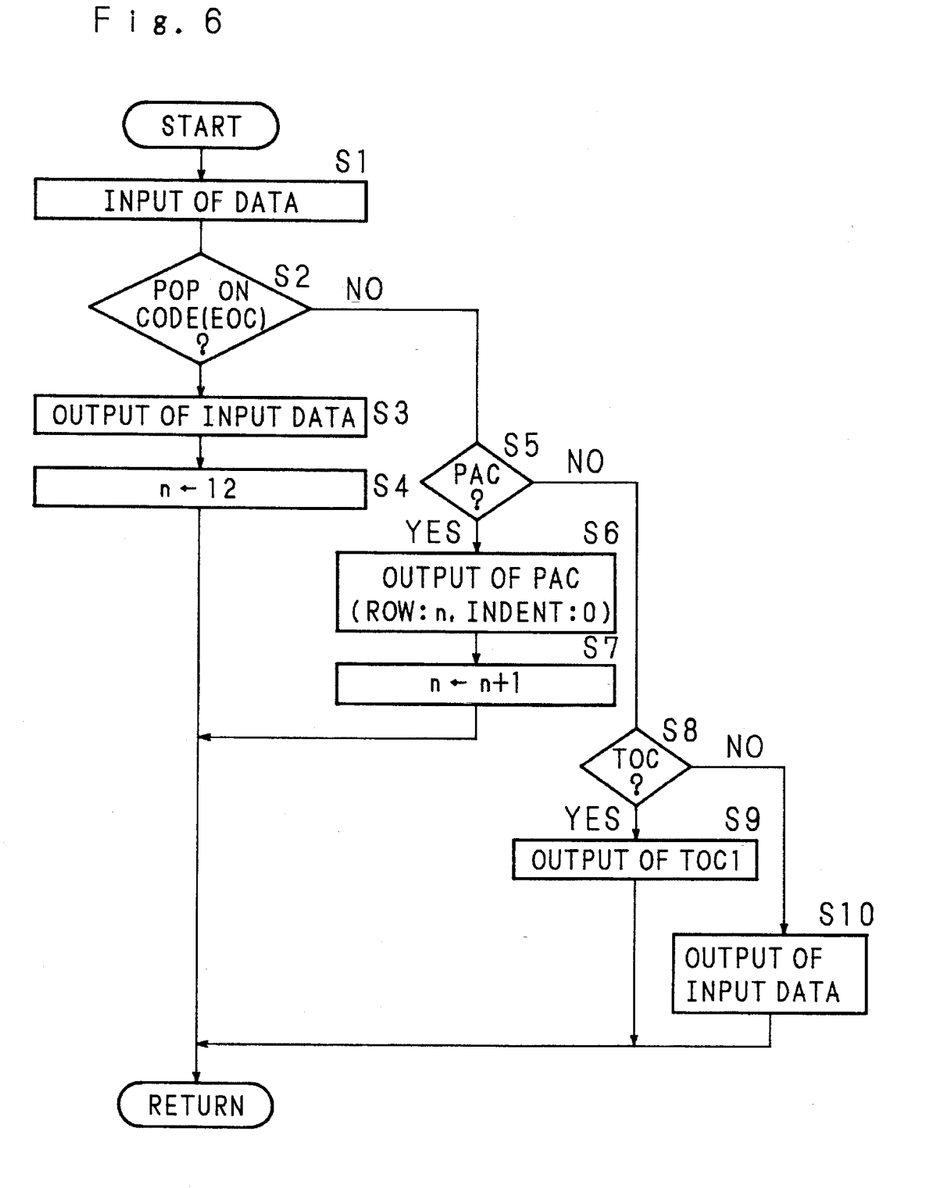
FIG. 6 is a flowchart showing the operating steps of the closed caption decoder according to the invention.

First, explanation will be made about the case in which the designation is such that the title including a maximum of four rows is displayed in pop-on style on the four lines From the 12th row at the lower left to the 15th row from the left end, with reference to the flowchart of FIG. 6 showing the particular algorithm.

Upon application of the data analyzed by the decoder 2 to the address converter 4 (S1), decision is made as to whether a pop-on code (hereinafter referred to as EOC (End Of Caption)) is involved or not (S2). In the case where the input data is EOC, the particular data is outputted as it is (S3), and "12" is set at the address variable "n" on the row (S4) thereby to return to wait for the next data input. Step S4 sets n=12, which means that the position of the character string to be displayed in preparation for the next caption character is initialized at the time of displaying the caption character.

In the case where the decision at step S2 is that the input data is not EOC, decision is made as to whether the PAC is involved or not (S5). When the PAC is involved, the PAC of "row n, indent 0" is outputted (S6), the variable "n" is incremented by "1" (S7) and the return is made to wait for the next data input. When the decision at step S5 is that the input data is not PAC, decision is made as to whether it is TOC or not (S8). In the case where TOC is involved, TOC1 (the code designating the movement one column rightward from the position designated by PAC) is outputted (S9), thereby returning to wait for the next data input. In the case where the decision at steps S2, S5, S8 is that the input data is the data code other than EOC, PAC or TOC, the particular data is outputted as it is (S10), followed by the return to wait for the next data input.

In the pop-on style, a title of four lines in maximum arrives. This character string and the column position are located in the safe caption area. According to the example under consideration, in the case where the address code is inputted in the pop-on style, the TOC is canceled and fixed to TOC1 for moving the column position by one. As regards the character string, the first to fourth rows of character immediately after EOC are converted to the 12th to 15th rows, respectively.

Figure 7A:
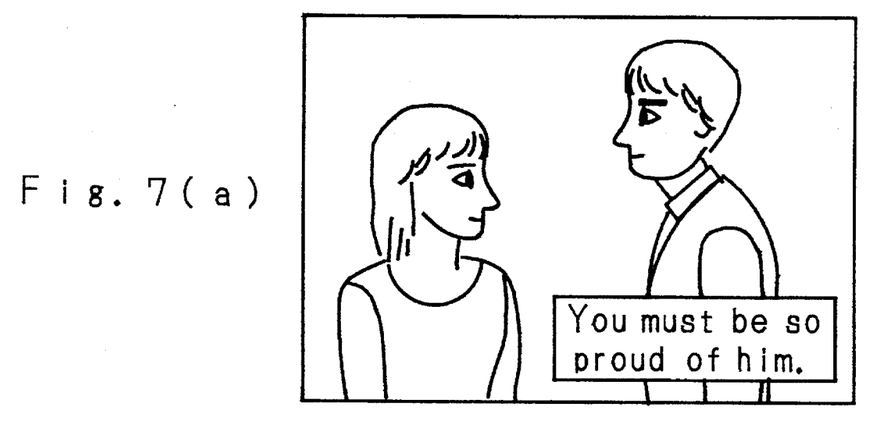
FIGS. 7(a), 7(b), 7(c) are diagrams comparing a display example of the caption information by a closed caption decoder according to the invention with a conventional example of display.
Figure 7B:
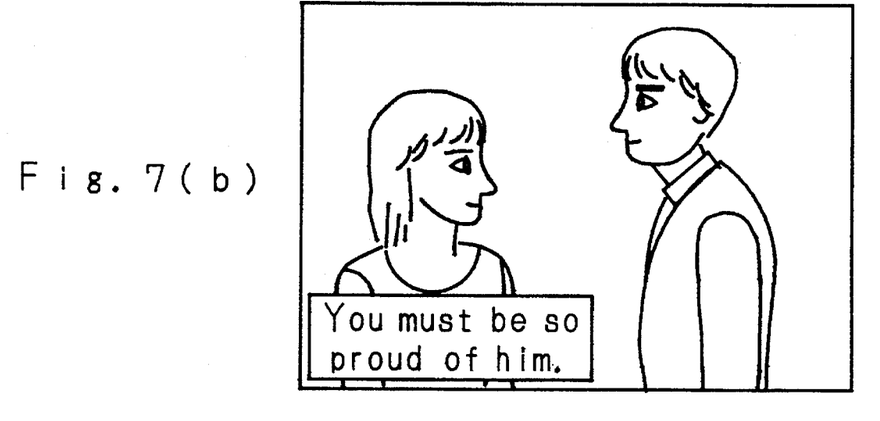

The above-mentioned operation is repeated, thereby making it possible to change the display position of the caption information from that shown for the conventional caption decoder in FIG. 7(a) to the position shown in FIG. 7(b).

Although the aforementioned embodiment concerns the case in which the caption information is displayed from the left end in the 12th to 15th rows, this is only an example, and the caption information can be displayed at an arbitrary position on the screen of the television receiver by setting the variable "n" at step S4 and the value of the indent at step S6 as desired.

Figure 8:
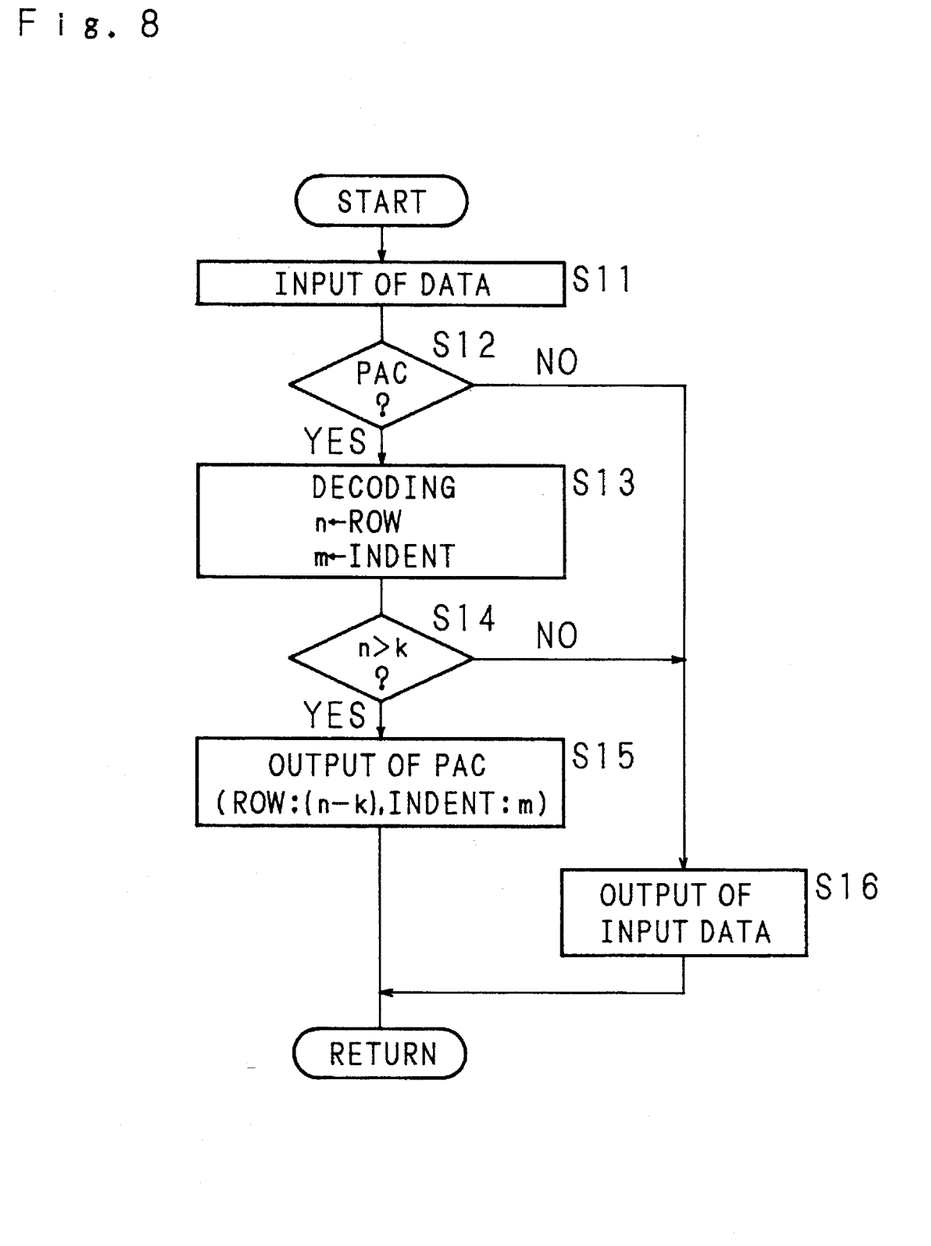
FIG. 8 is a flowchart showing the operating steps of a closed caption decoder according to the invention.

Now, explanation will be made about the case in which the title displayed in pop-on style is moved by k rows upward, with reference to the flowchart of FIG. 8 showing the algorithm. Character k designates a parameter set by the user through the input unit 9.

With the arrival of the data analyzed by the decoder 2 (S11), decision is made as to whether PAC is involved or not. In the case where the input data is PAC, the row and the indent of the PAC are analyzed to set the number of row to "n" and the number of indent to "m" (S13). The value of n is compared with the value k providing the number of rows to be moved (S14). In the case where the value n is larger than the value k, i.e., where the movement by k rows upward does not result in the overflow of the safe caption area, the PAC representing "row (n-k), indent m" is outputted (S15), followed by the return to wait for the next data input. In the case where the value n is not larger than the value k as a result of decision at step S14, i.e., where the movement by k rows upward results in the overflow from the safe caption area, on the other hand, the PAC "row n, indent m" representing the input data directly is outputted (S16), thus returning to wait for the next data input. Also, in the case where the decision at step S12 shows that the input data is other than PAC (including TOC), the particular data is outputted as it is (S16) followed by returning to wait for the next data input.

The upward movement by k rows is equivalent to the movement of the caption information that has so far been located at the lower portion of the screen. In the case where the movement by k rows causes an overflow from the safe caption area, the caption information is considered to be intentionally displayed at the upper portion of the screen by the sending side for some purposes. In that case, therefore, the display is made at the position designated by the sending side without moving the caption information.

Figure 7C:
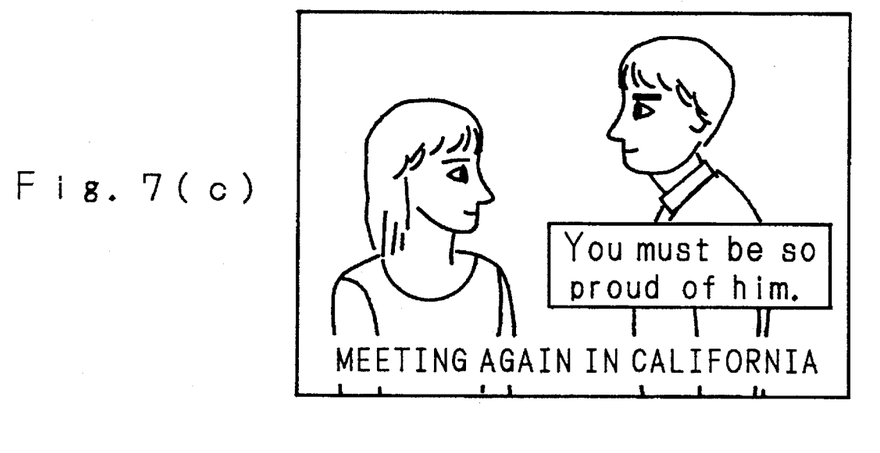

The aforementioned operation is repeated thereby making it possible to change the display position of the caption information that so far could not be displayed at other than the position shown in FIG. 7(a) in the conventional closed caption decoder to the display position as shown in FIG. 7(c). The caption information can thus be displayed without sacrificing the visibility of the superimposed information.

Figure 9:
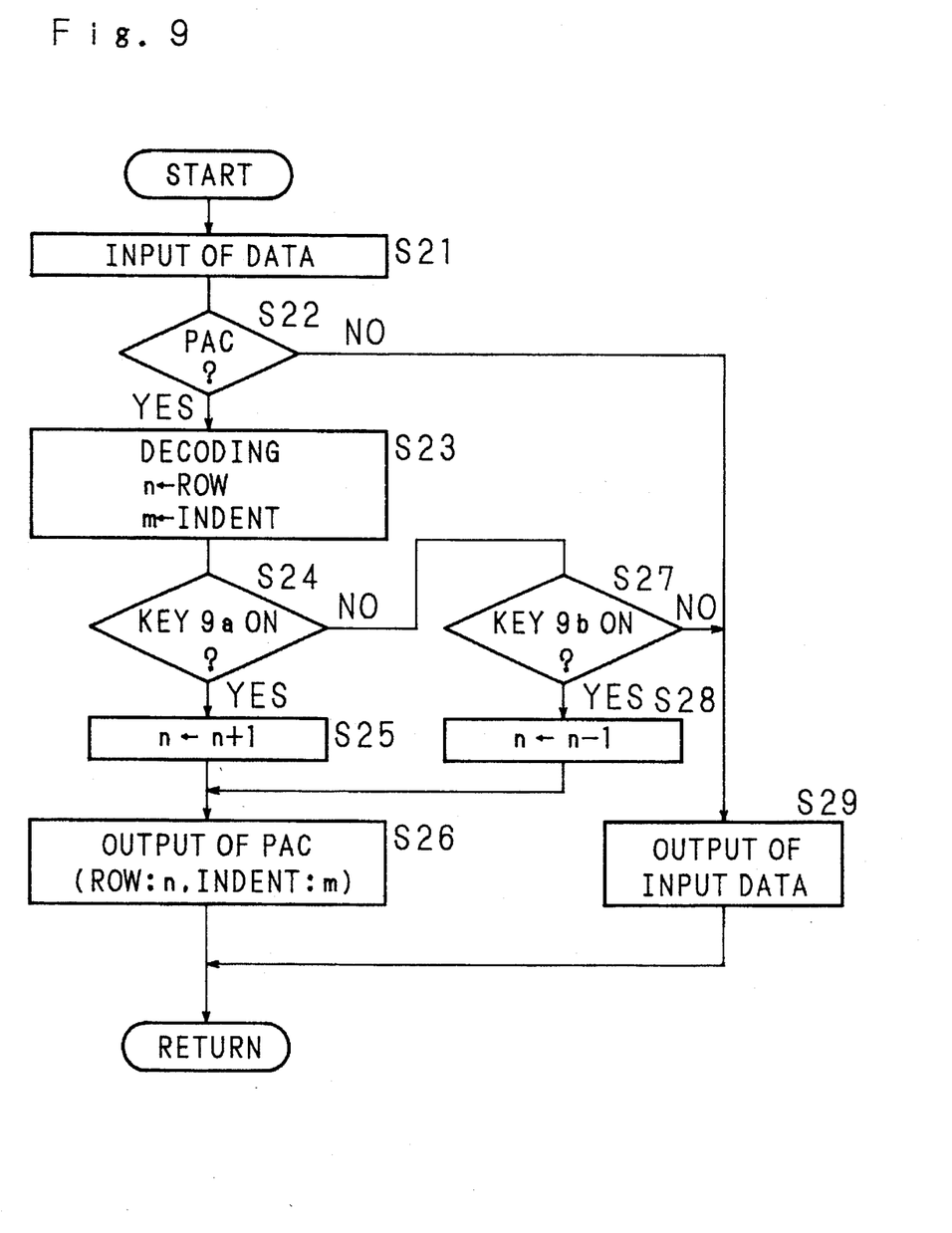
FIG. 9 is a flowchart showing the operating steps of a closed caption decoder according to the invention.

Now, explanation is made about the case in which the up key 9a or the down key 9b at the input unit 9 is depressed to move the caption information by one row upward or downward, with reference to the flowchart of FIG. 9 showing the algorithm involved.

Upon application thereto of the data analyzed by the decoder 2 (S21), decision is made as to whether the PAC is involved or not (S22). In the case where the input data is PAC, the row and indent of the particular PAC are analyzed to set the number of row to "n" and the number of indent to "m" (S23). Decision is made as to whether the up key 9a is depressed or not (S24), and when it is depressed, "n" is incremented by "1" (S25), after which the PAC of "row n, indent m" is outputted (S26), thereby returning to wait for the next data input. In the case where the up key 9a is not depressed, decision is made as to whether the down key 9b is depressed or not (S27), and when it is depressed, "n" is decremented by "1" (S28), after which the PAC of "row n, indent m" is outputted (S26), thereby returning to wait for the next data input. When the decision at step S27 shows that the down key 9b is not depressed, the PAC of "row n, indent m" providing the input data as it is outputted (S29), followed by returning to wait for the data input. Also, in the case where the decision at step S22 is that the input data is other than PAC (including TOC), the particular data is outputted as it is (S29), followed by a return to wait for the next data input.

The aforementioned operation is repeated thereby making it possible to display the caption information moved by one row upward or downward.

Unlike in the above-mentioned case in which an arbitrary conversion address is designated by the input unit 9, a predetermined address is previously stored in the address converter 4 and the address data analyzed by the decoder 2 is converted always to the predetermined address data. In this case, the set key 9d at the input unit 9 is depressed to display the caption information always at a predetermined position on the screen.

(Second embodiment)

Explanation will be made about a closed caption decoder according to the second embodiment of the invention. The second embodiment is such that title information, superimposed information or like character information, if any, in the video signal is automatically detected, and the display position of the caption information is displaced in such a manner that the caption information is not overlapped on the display position of character information.

Figure 10:
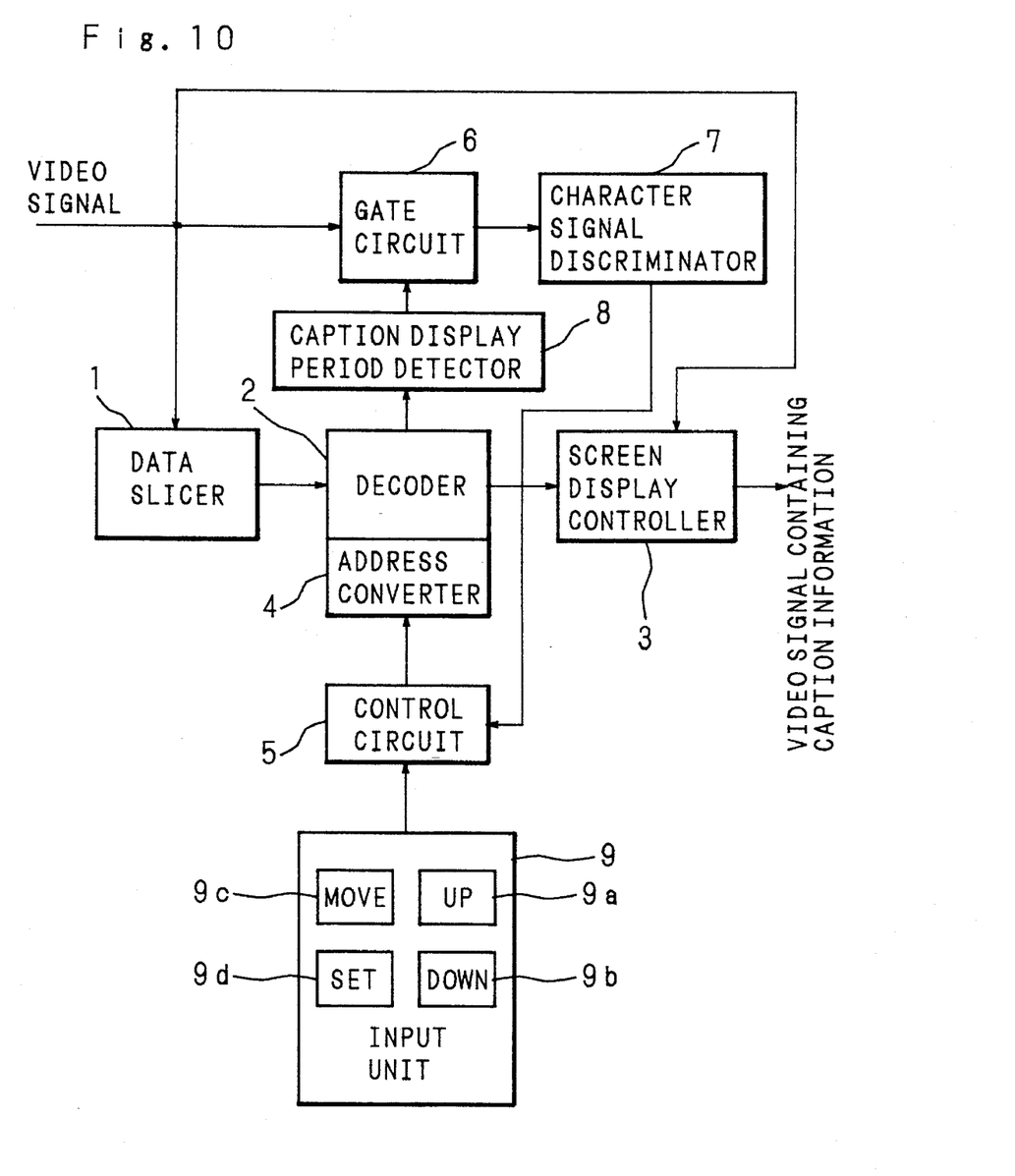
FIG. 10 is a block diagram showing the configuration of a closed caption decoder according to a second embodiment of the invention.

FIG. 10 is a block diagram showing a closed caption decoder according to the second embodiment. In FIG. 10, the same reference numerals designate the same component parts as the corresponding parts in FIG. 5, respectively. The configuration of FIG. 10 has a gate circuit 6, a character signal discriminator 7 and a caption display period detector 8 added to the configuration of FIG. 5.

The caption display period detector 8 detects the display period of the caption information based on the analysis result from the decoder 2, and opens the gate circuit 6 for the particular display period to pass the video signal. The character signal discriminator 7 decides as to whether the video signal that has passed the gate circuit 6 contains a character signal, and when it contains a character signal, notifies the fact to the control circuit 5. The control circuit 5 controls the address converter 4 to move the display position of the caption information in such a way that the caption information may not be overlapped on the character information in the video signal.

Now, the operation of the embodiment is explained. The information as to which scanning line provides the display of the caption information as specified from the analysis result of the decoder 2 is applied to the caption display period detector 8, and the gate circuit 6 is opened for the scanning period when the caption information is displayed thereby to apply the video signal to the character signal discriminator 7 through the gate circuit 6.

The character signal discriminator 7 decides whether the video signal thus passed contains a character signal. According to the method of decision employed in the process, as disclosed in Japanese Patent Application Laid-Open No.4-159878 (1992), a character is considered to be displayed in white and the ratio of the number of white pixels to the number of all pixels in the video signal is calculated, and the result of calculation is used to decide on the presence or absence of the character signal. More specifically, when the ratio is 5% to 50%, decision is made that a character signal is contained. In the case where a character signal is contained, the information indicating the presence of a character is applied to the control circuit 5.

Upon application of the character presence information to the control circuit 5, the address converter 4 is controlled by the control circuit 5, so that the display position of the caption information is automatically moved not to be overlapped on the character information in the video signal.

The remaining operation of this embodiment is identical to that of the first embodiment and therefore will not be explained any more.

According to the second embodiment, in the case where the caption information is overlapped on the character information in the video signal, the display position of the caption information is automatically moved. Therefore, the trouble which otherwise might be taken to control the television receiver in order to confirm the character information by erasing the caption information is eliminated, and the character information incorporated in the video information can thus be recognized positively.

It will thus be understood from the foregoing description that in the closed caption decoder according to the invention, the display address of the caption information determined at the sending side of the video signal can be changed at the receiving side. For this reason, the display position of the caption information can be moved to other than the display area of the superimposed information contained in the video signal, for example, and therefore the voice information can be produced as a title in the form of a closed caption without missing the superimposed information.

Further, in the case where persons whose vernacular language is not English use the closed caption system to deepen their understanding of the contents of broadcast programs, the superimposed information and the title in the form of a closed caption can be effectively utilized, thereby enabling them to deeply understanding the contents of programs as intended.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A closed caption decoder, comprising:

means for detecting a display address contained in a caption signal multiplexed on a video signal;

means for designating, based on a detection of said display address, a display position of the caption information on a screen; and means for converting the detected display address into a display address corresponding to the designated display position.

2. A television receiver comprising a closed caption decoder according to claim 1, wherein the caption information is displayed on a screen together with an image.

3. A closed caption decoder, comprising:

means for extracting an encoded caption signal multiplexed during a vertical retrace period of a video signal;

means for decoding the extracted caption signal;

means for designating, based on a detection of a display address, a display position of the caption information on a screen; and means for converting a display address contained in the caption signal into said display address corresponding to the designated display position.

4. A closed caption decoder, comprising:

means for detecting a display address contained in a caption signal multiplexed on a video signal;

means for detecting the display period of the caption information based on a result of a display address detection;

means for deciding whether character information is contained in the video signal during the display period of the caption information; and means for converting the detected display address into a display address different from that for the character information in the video signal in the case where decision is made that the character information is contained in the video signal.

5. A television receiver comprising a closed caption decoder according to claim 4, wherein the caption information is displayed on a screen together with an image.

6. A closed caption decoder comprising:

means for extracting an encoded caption signal multiplexed during a vertical retrace period of a video signal;

means for decoding the extracted caption signal;

means for detecting the display period of the caption information from the decoding result;

means for deciding whether character information is contained in the video signal during the display period of the caption information; and means for converting a display address contained in the caption signal into a display address corresponding to the display position not overlapped with the display position of the character information in the video signal in the case where decision is made that the character information is contained in the video signal.

* * * * *